United States Patent [19]

Grell et al.

[11] Patent Number: 5,670,265
[45] Date of Patent: Sep. 23, 1997

[54] STEEL COMPONENT WITH AN ELECTROPLATED ANTI-CORROSIVE COATING AND PROCESS FOR PRODUCING SAME

[75] Inventors: Karl Ludwig Grell, Aurachtal; Reiner Woltmann, Herzogenaurach, both of Germany

[73] Assignee: Ina Walzlager Schaeffler KG, Germany

[21] Appl. No.: 385,797

[22] Filed: Feb. 9, 1995

Related U.S. Application Data

[63] Continuation of Ser. No. 949,636, filed as PCT/EP91/01769 Sep. 17, 1991, abandoned.

[30] Foreign Application Priority Data

Oct. 20, 1990 [DE] Germany ............... 40 33 459.7
Aug. 2, 1991 [DE] Germany ............... 41 25 585.2

[51] Int. Cl.$^6$ .................. C25D 7/10; B32B 15/18; F16C 19/00
[52] U.S. Cl. ................ 428/612; 205/50; 205/95; 205/151; 205/245; 205/246; 428/659; 428/687
[58] Field of Search ................ 205/50, 95, 149, 205/151, 245, 246; 428/612, 659, 679, 682, 687

[56] References Cited

U.S. PATENT DOCUMENTS

| | | | |
|---|---|---|---|
| 4,484,988 | 11/1984 | Robinson | 205/187 |
| 4,508,396 | 4/1985 | Doi et al. | 384/463 |
| 4,908,280 | 3/1990 | Omura et al. | 428/679 |
| 4,946,747 | 8/1990 | Bergmann et al. | 428/653 |
| 5,116,144 | 5/1992 | Kamiya et al. | 384/291 |

FOREIGN PATENT DOCUMENTS

| | | | |
|---|---|---|---|
| 3933896 | 10/1990 | Germany | C25D 5/18 |
| 2236763 | 4/1991 | United Kingdom . | |

OTHER PUBLICATIONS

John L. Vossen, *Thin Film Processes*, Academic Press, New York, 1978, pp. v–vii, 11 and 209.

M. Sarojamma et al, Electrodeposition of Tungsten Alloys, *Metal Finishing*, Nov., 1971, pp. 42–48.

*Primary Examiner*—Kathryn L. Gorgos
*Assistant Examiner*—William T. Leader
*Attorney, Agent, or Firm*—Bierman, Muserlian & Lucas

[57] ABSTRACT

A steel component is provided on its surface with an electroplated anti-corrosive coating of a metallic material and has a hardness of at least 650 HV, the anti-corrosive coating being thinner than the surface roughness which the hardened component had before the application of the protective coating. Advantageously, the component is a rolling bearing component with a surface roughness $R_z$ of 0.3 to 9.0 μm and a coating thickness of 0.1 to 3.0 μm. Preferably, the anti-corrosive coating comprises a zinc-cobalt alloy, a zinc-iron alloy or a zinc-nickel alloy coating. It is possible to add iron, tin, copper or chromium to the coating composition.

10 Claims, No Drawings

STEEL COMPONENT WITH AN ELECTROPLATED ANTI-CORROSIVE COATING AND PROCESS FOR PRODUCING SAME

PRIOR APPLICATION

This application is a continuation of U.S. patent application Ser. No. 949,636, filed as PCT/EP91/01769 Sep. 17, 1991, now abandoned.

The invention concerns a steel component provided on its surface with an electroplated anti-corrosive coating of a metallic material.

From DE-OS 54 14 048 a method of manufacturing steel components electroplated with a zinc-nickel alloy is known. In this method the steel component is at first pre-plated in an acid bath containing zinc and nickel, for example in the form of zinc sulphate and nickel sulphate. Following this priming treatment a further layer is applied by electroplating in an electrolytic bath containing zinc, nickel, titanium and aluminium. This method is adopted because it has been seen that the adherence of the zinc-nickel alloy to the steel substrate can be improved by pre-plating the steel parts prior to actual electroplating with zinc and nickel.

The thickness of the pre-plated layer of the known method is indicated as being in the order of 0.5 to 1.0 μm, no indications, however, being given as to the state of roughness of the surface or the hardness of the steel component to be coated. This prior art document also teaches the addition of further metals such as cobalt, chromium, iron and magnesium to the main electroplating bath. This method is labour-intensive since it basically prescribes pre-plating of the steel components in addition to the main electroplating.

The object of the invention is to provide an economically manufacturable precision steel component comprising a thin but reliable and effective anti-corrosive coating.

This object is achieved according to the invention in that the component has a Vickers hardness of at least 650 HV, the anti-corrosive coating being thinner than the surface roughness which the hardened component had before the application of the protective coating. Such a component can be economically manufactured. It offers the advantage that the thin anti-corrosive cooling can be applied in a single electroplating operation without the need of subsequent treatment. Due to the small coating thickness, the dimensional precision of the component is not, prejudiced.

Advantageously, the component can be a rolling bearing component with a surface roughness $R_z$ of 0.3 to 9.0μthe thickness of the applied anti-corrosive coating being in the order of 0.1 to 3.0 μm. In such a rolling bearing, the tribological loading, as for example an over-rolling of the rolling elements has no negative consequences for the operating life. Under this type of loading of the outermost edge region, the ductile non-ferrous layers are pressed into the roughness profile of the fine form of the running face to which they adhere firmly. Surplus material i pressed out of the compression zone of the running face. Thus, after a short running-in phase of a few cycles, a fully operative rolling bearing with high anti-corrosive properties is obtained. The rolling fatigue strength is not deteriorated by the described processes of rolling-in into the roughness depth, but rather improved. In the case of ground rolling bearing running faces, a fine, not too smooth surface topography is produced, i.e., roughness values $R_z$ in the order of 0.3 μm are obtained so that a cost-intensive honing can be done without and the rolling bearing possesses better running properties after the application of the anti-corrosive coating.

Advantageously, the thickness of the anti-corrosive coating corresponds to a quarter of the thickness of the surface roughness of the running face of the hardened rolling bearing component. The anti-corrosive coating can have a binary or ternary material composition. It is possible to add iron, tin, copper or chromium to the metallic anti-corrosive coating. Advantageously, the metallic anti-corrosive coating can be a zinc-cobalt, zinc-iron or zinc-nickel coating. If a zinc-nickel coating is chosen, the advantageous thickness of the coating is at the most 1.5 μm.

With a rolling bearing component of the invention it is achieved that on initial operation of the rolling bearing, the applied anti-corrosive coating penetrates into the roughness profile of the surface and thus exercises no negative influence on the tolerances of the component. By an extremely fine abrasion within the roughness depth of the rolling bearing running face, particles from the coating are rolled-in and improve the rust protection of the running face and thereby of the rolling bearing and constitute a kind of emergency running or dry lubrication. Since the coatings of the components made according to the invention have thicknesses of only about 10% of the hitherto known coating thicknesses, the components constitute a special contribution to environmental protection from the point of view of minimizing environmental load.

What is claimed is:

1. A process for the production of a rolling bearing component with an electrolytically applied anti-corrosive metallic coating on its surface comprising electroplating a hardened rolling bearing component of steel with a Vickers hardness of at least 650 HV and a surface roughness $R_z$ between 0.3 and 9.0 μm to provide the anti-corrosive metallic coating as a ZnCo coating which is thinner than the surface roughness $R_z$ and has a thickness of 0.1 to 3.0 μm.

2. The process of claim 1 wherein the thickness of the metallic coating is one quarter that of the surface roughness.

3. The process of claim 1 wherein the ZnCo metallic coating addition contains iron.

4. A hardened rolling bearing component with an anti-corrosive coating produced by the process of claim 3.

5. A hardened rolling bearing component with an anti-corrosive coating produced by the process of claim 1.

6. A process for the production of a rolling bearing component with an electrolytically applied anti-corrosive metallic coating on its surface comprising electroplating a hardened rolling bearing component of steel with a Vickers hardness of at least 650 HV and a surface roughness $R_z$ between 0.3 and 9.0 μm to provide the anti-corrosive metallic coating as a ZnNi coating which is thinner than the surface roughness $R_z$ and has a thickness of 0.1 to 3.0 μm.

7. The process of claim 6 wherein the thickness of the ZnNi coating is not more than 1.5 μm.

8. A hardened rolling bearing component with an anti-corrosive coating produced by the process of claim 6.

9. A process for the production of a rolling bearing component with an electrolytically applied anti-corrosive metallic coating on its surface comprising electroplating a hardened rolling bearing component of steel with a Vickers hardness of at least 650 HV and a surface roughness $R_z$ between 0.3 and 9.0 μm to provide the anti-corrosive metallic coating as a ZnFe coating which is thinner than the surface roughness $R_z$ and has a thickness of 0.1 to 3.0 μm.

10. A hardened rolling bearing component with an anti-corrosive coating produced by the process of claim 9.

* * * * *